United States Patent
Yajima et al.

(10) Patent No.: US 9,530,004 B2
(45) Date of Patent: Dec. 27, 2016

(54) SECURE BOOT METHOD, SEMICONDUCTOR DEVICE AND RECORDING MEDIUM

(71) Applicant: SOCIONEXT INC., Yokohama-shi, Kanagawa (JP)

(72) Inventors: Jun Yajima, Kawasaki (JP); Kenji Saito, Hachiouji (JP)

(73) Assignee: SOCIONEXT INC., Yokohama (JP)

( * ) Notice: Subject to any disclaimer, the term of this patent is extended or adjusted under 35 U.S.C. 154(b) by 101 days.

(21) Appl. No.: 14/471,280

(22) Filed: Aug. 28, 2014

(65) Prior Publication Data
US 2015/0074384 A1 Mar. 12, 2015

(30) Foreign Application Priority Data
Sep. 10, 2013 (JP) ................. 2013-187064

(51) Int. Cl.
*G06F 21/57* (2013.01)

(52) U.S. Cl.
CPC ..... *G06F 21/575* (2013.01); *G06F 2221/2109* (2013.01)

(58) Field of Classification Search
CPC .................................................. G06F 21/575
See application file for complete search history.

(56) References Cited

U.S. PATENT DOCUMENTS

| | | | | |
|---|---|---|---|---|
| 6,463,535 B1* | 10/2002 | Drews | ................... | G06F 9/4416 713/176 |
| 8,971,538 B1* | 3/2015 | Marr | ................... | H04L 63/145 380/285 |
| 2001/0016927 A1* | 8/2001 | Poisner | ............... | G06F 11/1004 714/718 |
| 2003/0084298 A1* | 5/2003 | Messerges | ........... | H04L 9/3236 713/176 |
| 2004/0177354 A1 | 9/2004 | Gunyakti et al. | | |
| 2006/0161761 A1* | 7/2006 | Schwartz | ................ | G06F 21/52 711/216 |
| 2008/0244553 A1* | 10/2008 | Cromer | ................. | G06F 21/572 717/168 |
| 2014/0043059 A1* | 2/2014 | Speers | ................. | H03K 19/003 326/9 |
| 2014/0281354 A1* | 9/2014 | Tkacik | ................ | G06F 12/1009 711/206 |

FOREIGN PATENT DOCUMENTS

JP 2004-265422 9/2004

* cited by examiner

*Primary Examiner* — Saleh Najjar
*Assistant Examiner* — Khang Do
(74) *Attorney, Agent, or Firm* — Staas & Halsey LLP

(57) ABSTRACT

A secure boot method for a system, the system including a processor and a storage medium configured to store a program, a plurality of first partial hash values calculated based on a plurality of first partial programs into which the program is divided, and a first legitimate hash value which is a hash value calculated based on a plurality of first legitimate partial hash values, the plurality of first legitimate partial hash values being calculated based on a plurality of legitimate partial programs. The secure boot method includes calculating, a second calculated hash value based on the plurality of first partial hash values, and determining, whether or not the second calculated hash value matches the first legitimate hash value to continue the start-up processing of the system when the determination indicates match, and suspend the start-up processing of the system when the determination does not indicate match.

20 Claims, 15 Drawing Sheets

SECURE BOOT METHOD, SEMICONDUCTOR DEVICE AND RECORDING MEDIUM

CROSS-REFERENCE TO RELATED APPLICATION

This application is based upon and claims the benefit of priority of the prior Japanese Patent Application No. 2013-187064, filed on Sep. 10, 2013, the entire contents of which are incorporated herein by reference.

FIELD

The embodiment discussed herein is related to a secure boot method, a semiconductor device and a non-transitory computer-readable recording medium.

BACKGROUND

In an increasing number of situations, important data is processed, for instance, in automobiles designed from the perspective of human life protection, embedded terminals for handling electronic money, or embedded devices such as game machines which handle content data. In devices such as these, there is a risk of manipulation of the OS or firmware by a malicious third-party, giving rise to unexpected operations. In response to this, a secure boot method exists as a technique for enabling only the OS and firmware intended by the developer to be operated.

Furthermore, when a general embedded device is started up, firstly, the boot ROM is called up and the prescribed code is executed in sequence. Thereupon, a detailed process is called up by a boot ROM of the firmware, or the like, and complex processing of the OS, or the like, is also called up. In this way, more complex processing is called up successively in the call-up sequence.

Therefore, in a secure boot of an embedded device, a part which cannot be rewritten, such as the ROM (boot ROM), serves as a reliable operation starting point, and a firmware hash value is calculated each time firmware is called up as a child process. If the calculated hash value matches a legitimate hash value for the firmware which has been stored previously in the ROM, then the firmware is considered to be authentic firmware and is started up. Thereupon, when the OS is called up as a grandchild process, a hash value is calculated for the OS program. If the calculated hash value matches a legitimate hash value for the OS program which has been stored previously in the child process, then the OS is considered to be an authentic OS and is started up.

By repeating a process of this kind in the secure boot step, it is possible to execute only the program intended by the developer. A system using hash values is described in Japanese Patent Application Publication No. 2004-265422, for example.

SUMMARY

In general, the size of a program becomes progressively larger in the sequence of call up, from the boot ROM, to the firmware to the OS. Therefore, the size of the OS program, for example, may be several hundred megabytes. However, if the size of the program is large, then since a CPU in an embedded device environment generally has a poor processing capacity, the processing for calculating the hash values for the programs represents a large load, and it takes a very long time indeed to start up the OS.

According to a first aspect of the embodiment, a secure boot method for a system, the system including a processor and a storage medium configured to store a program, a plurality of first partial hash values calculated based on a plurality of first partial programs into which the program is divided, and a first legitimate hash value which is a hash value calculated based on a plurality of first legitimate partial hash values, the plurality of first legitimate partial hash values being calculated based on a plurality of legitimate partial programs into which a legitimate program is divided, the legitimate program corresponding to the program, the secure boot method including, calculating, by the processor, during start-up of the system, a second calculated hash value based on the plurality of first partial hash values stored in the storage medium, and determining, by the processor, whether or not the second calculated hash value matches the first legitimate hash value to continue the start-up processing of the system when the determination indicates match, and suspend the start-up processing of the system when the determination does not indicate match.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

[Configuration of Semiconductor Device]

Figure 1:
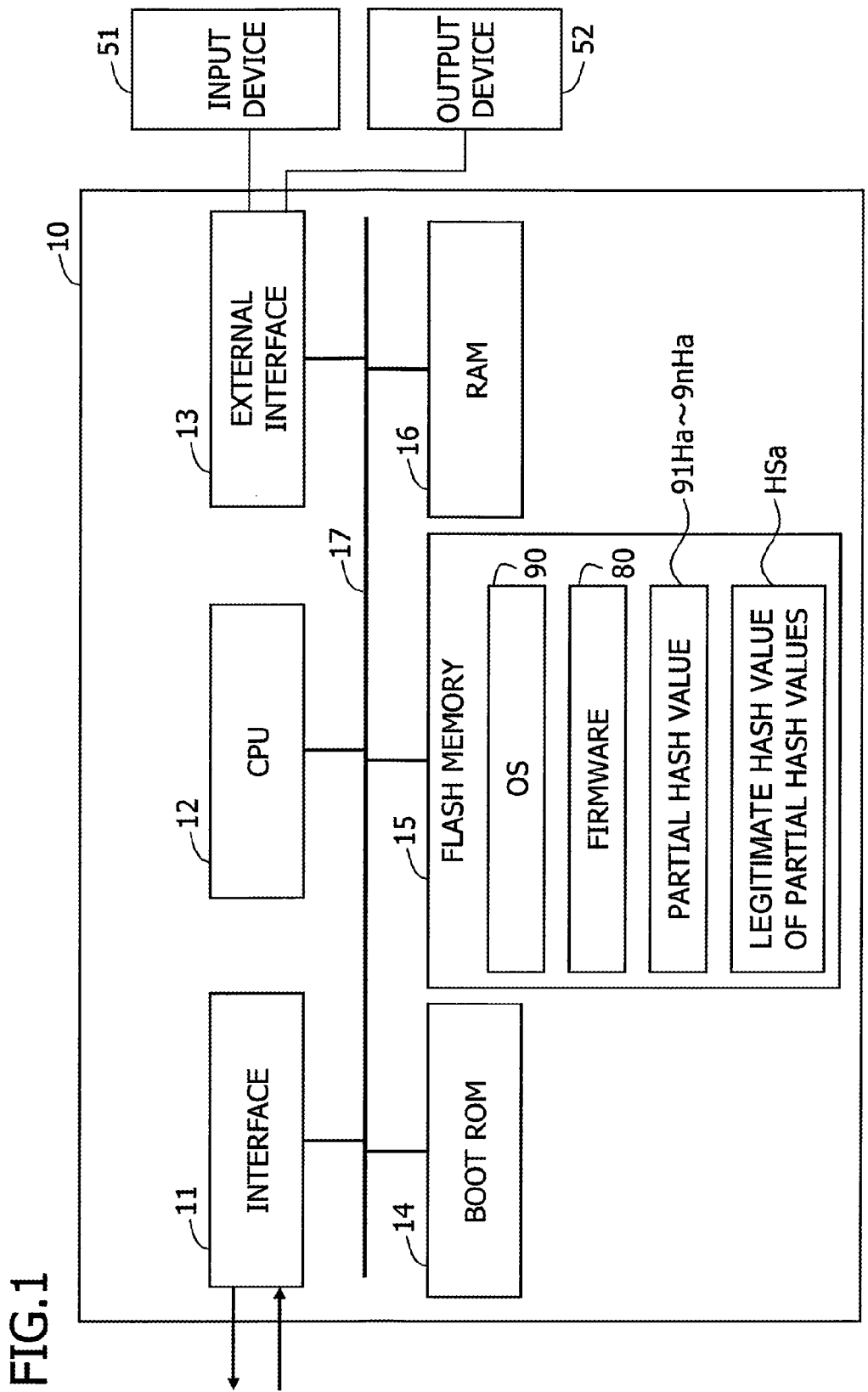
FIG. 1 is a diagram depicting one example of the configuration of a semiconductor device according to an embodiment of the invention.

FIG. 1 is a diagram depicting one example of the configuration of a semiconductor device 10 according to an embodiment of the invention. The semiconductor device 10 is a semiconductor device 10 of an embedded device, for example. The semiconductor device 10 in FIG. 1 comprises, for example, a central processing unit (CPU) 12, a boot read only memory (ROM) 14, a flash memory 15, a random access memory (RAM) 16, an interface 11, and an external interface 13. These units are connected to each other via a bus 17.

The boot ROM 14 stores an initial program loader (IPL) which runs initially when the power supply of the semiconductor device 10 is turned on and a program for starting up the device driver of the flash memory 15. Furthermore, the flash memory 15 stores an operating system (hereinafter called "OS") 90, a firmware 80 program, secure boot hash values 91Ha to 91nHa, HSa, etc. The flash memory 15 may be a separate storage medium, such as HDD. The interface 11 controls input and output of data from and to external devices. For example, update data for the OS program 90, and the like, is input via the interface 11. Moreover, the external interface 13 controls input and output of data from and to the input device 51 and the output device 52.

[Flow of Secure Boot]

Figure 2:
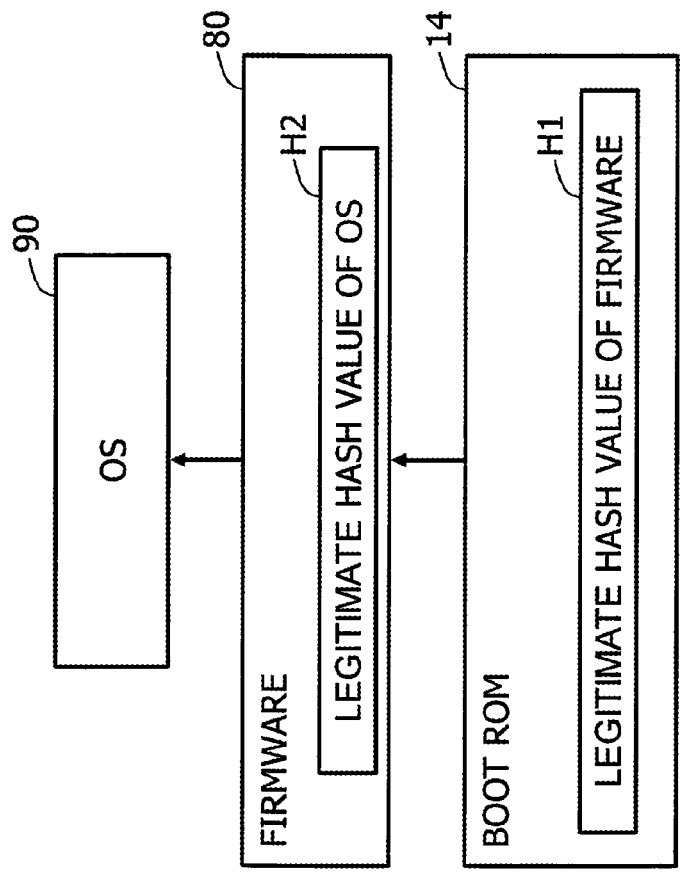
FIG. 2 is a diagram depicting a flow of a general secure boot operation.

FIG. 2 is a diagram depicting a flow of a general secure boot operation. In a secure boot, if it has confirmed that the firmware 80 or OS 90 to be started up is trustworthy, then a start-up process is carried out. Therefore, for instance, the boot ROM 14 stores a legitimate hash value H1 for the firmware in order to verify that the firmware 80 is authentic. Furthermore, the firmware 80 stores a legitimate hash value H2 for the OS 90 in order to verify that the OS 90 has not been manipulated.

The hash values indicate data of a fixed length which is output by computing data of an arbitrary length by a hash function. When the same input data is used, the hash function calculates the same hash value. The length of the hash values calculated by the same hash function is a fixed length, regardless of the length of the input data. The hash functions include, for instance, SHA-1, SHA-256, SHA-384, SHA-512, SHA-224, Wirlpool, MD5, SHA-3, and so on. The length of the hash values varies with the hash function, but may be, for example, 128 bits, 160 bits, 224 bits, 256 bits, 384 bits, 512 bits, or 1024 bits, etc.

In FIG. 2, when the power supply to the embedded device is turned on, the CPU 12 executes a boot loader which is written to the boot ROM 14. Consequently, the IPL is executed, and the legitimate hash value H1 for the firmware 80 is read out. The CPU 12 then calculates a hash value on the basis of the firmware 80 stored in the flash memory 15, or the like, and compares this hash value with the legitimate hash value H1. If the hash values match each other, then the firmware 80 is started up, and if the hash values do not match each other, then the start-up of the firmware 80 is suspended. Therefore, if the firmware 80 stored in the flash memory 15 has been manipulated, the start-up of the firmware 80 is suspended. In other words, the CPU 12 only continues start-up process of the firmware 80, if the firmware 80 is authentic.

When start-up of the firmware 80 has been completed, the CPU 12 then verifies whether or not the program of the OS 90 is authentic. The legitimate hash value H2 of the OS 90 is stored, for example, inside the firmware 80 (in the flash memory 15). The CPU 12 calculates a hash value on the basis of the program of the OS 90, and compares this hash value with the legitimate hash value H2. If the hash values are matching, then the CPU 12 starts up the OS 90, whereas if the hash values are not matching, then the CPU 12 suspends start-up of the OS 90. Therefore, if the program of the OS 90 has been manipulated, the start-up of the OS 90 is suspended. Consequently, the CPU 12 only continues start-up process of the OS 90, if the OS 90 is authentic.

In this way, the OS 90 is finally started up by repeatedly calling up a second-level program (the OS 90 in the example in FIG. 2), from a first-level program (the firmware 80 in the example in FIG. 2). By processing in this way, for example, the secure booting of the system may take time due to the time taken by the process to calculate the hash values for the OS 90 program which has a large size.

Therefore, with the secure boot method according to the present embodiment, the system includes a processor, and a storage medium which stores a program, a plurality of first partial hash values calculated based on a plurality of first partial programs into which the program is divided, and a first legitimate hash value. The first legitimate hash value is a hash value calculated based on a plurality of first legitimate partial hash values, the plurality of first legitimate partial hash values being calculated based on a plurality of legitimate partial programs into which a legitimate program is divided, the legitimate program corresponding to the program. The secure boot method includes a calculating in which the processor inputs the plurality of first partial hash values stored on the storage medium, and calculates a second calculated hash value based on the plurality of first partial hash values, and a determining. In the determining, the processor determines whether or not the second calculated hash value matches the first legitimate hash value, and continues the start-up process of the system, when the determination indicates match, or suspends the start-up process of the system, when the determination does not indicate match.

According to the secure boot method of the present embodiment, a secure system is started up by rapid execution of the hash value calculation process, and furthermore, the system start-up time is shortened. Next, the secure boot method according to the present embodiment will be described in sequence.

[Overview of Processing: Start-Up]

Figure 3:
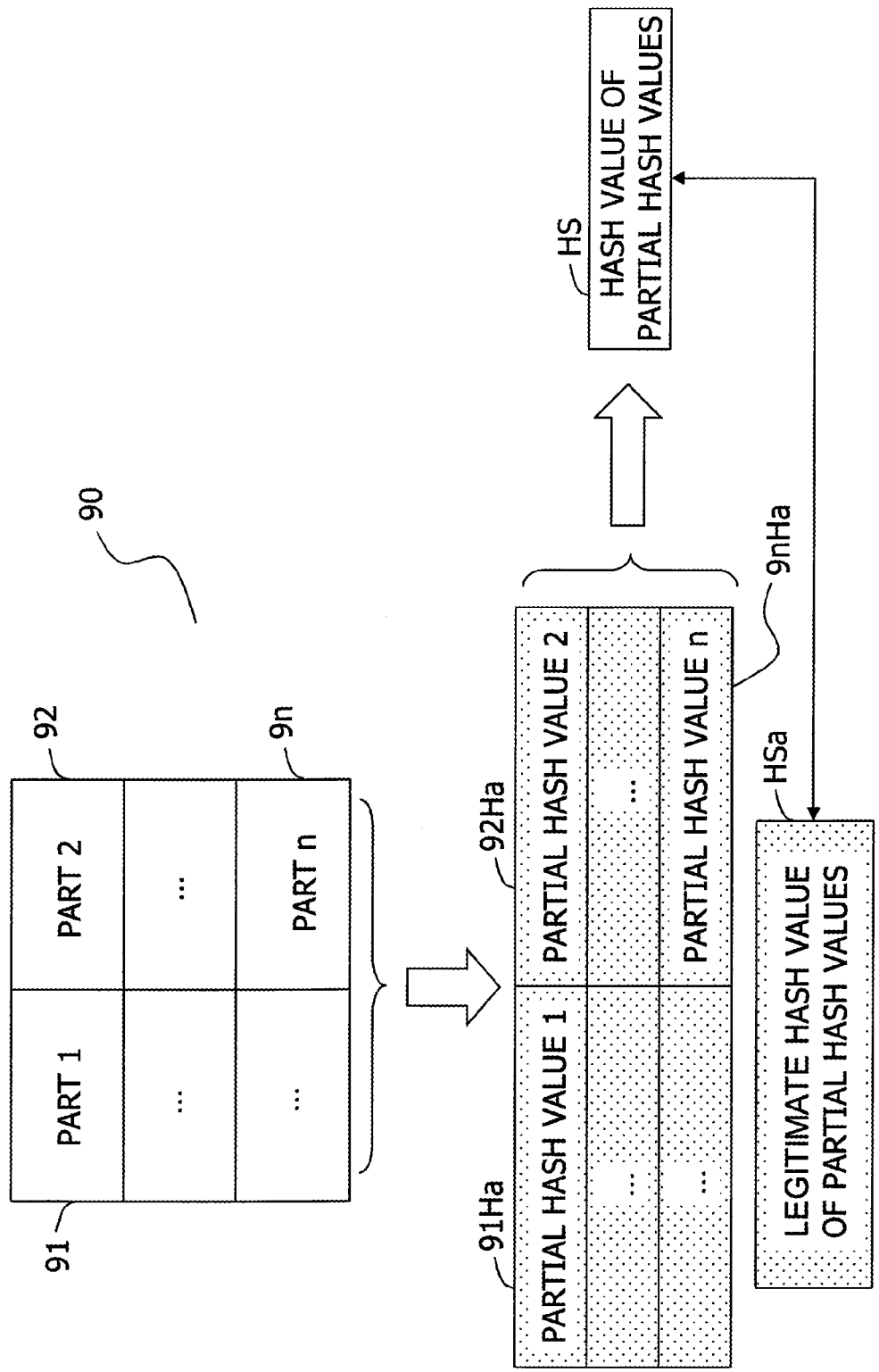
FIG. 3 is a diagram for illustrating an overview of steps during start-up of a secure boot method according to an embodiment of the invention.

FIG. 3 is a diagram for illustrating an overview of steps during start-up of a secure boot method according to an embodiment of the invention. This example discloses start-up steps for the OS 90. The secure boot method in the present embodiment is not limited to application to the start-up steps for the OS 90, and may also be applied to start-up steps for firmware 80 or an application.

In the present embodiment, as illustrated in FIG. 3, the program of the OS 90 is divided into a plurality of partial programs 91 to 9n, in order to generate hash values. In this example, the program of the OS 90 is divided, for example, into n partial programs 91 to 9n, from part 1 to part n. Respective hash values for each of the n divided partial programs 91 to 9n (called "partial hash values" below) 91Ha to 9nHa are stored previously in the firmware 80. In this example, the n partial hash values 91Ha to 9nHa are stored in the flash memory 15. Furthermore, the hash value HSa which is calculated by inputting n partial hash values 91Ha to 9nHa in a case where the n partial hash values 91Ha to 9nHa correspond to the programs 91 to 9n (the hash value HSa is called the "legitimate hash value of the partial hash values" below) is stored in the firmware 80. In this embodiment, there is one legitimate hash value HSa with respect to n partial hash values.

In FIG. 3, at the start-up of the OS 90, the n partial hash values 91Ha to 9nHa stored previously in the flash memory 15 are input to the hash function in a prescribed sequence, and one hash value HS of the partial hash values is calculated. For example, the partial hash values 91Ha to 9nHa are input to the hash function, in the sequence: partial hash value 91Ha of part 1, partial hash value 92Ha of part 2, . . . , partial hash value 9nHa of part n. The calculated hash value HS of the partial hash values is then compared with the legitimate hash value HSa of the partial hash values, which is stored previously. If the values are the same, then the OS 90 is started up and if they are not the same, then the start-up of the OS 90 is suspended.

[Flowchart: Start-Up]

Figure 4:
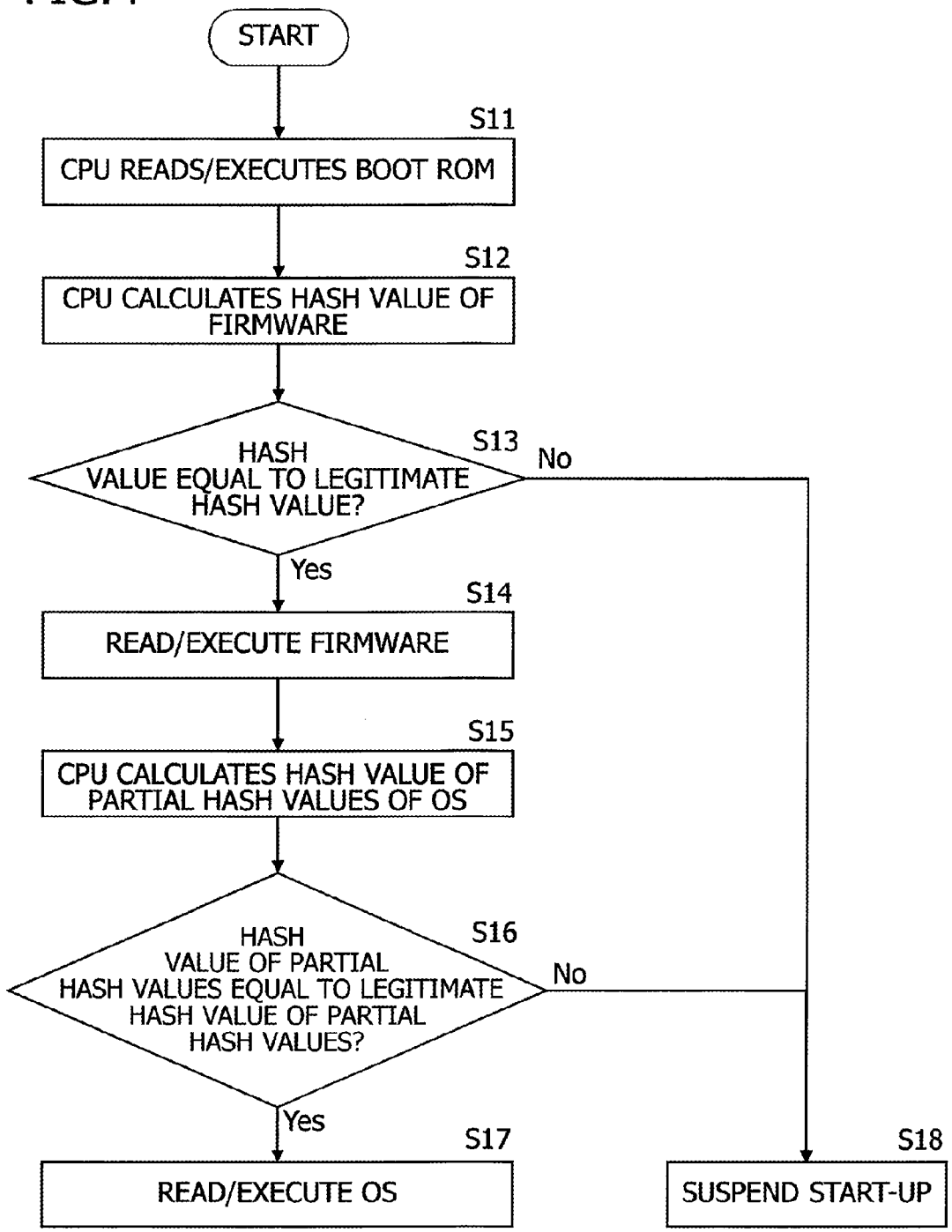
FIG. 4 is a flowchart illustrating start-up steps in a secure boot method according to the present embodiment.

FIG. 4 is a flowchart illustrating start-up steps in a secure boot method according to the present embodiment. When the power supply of the embedded device is switched on, the CPU 12 reads in the boot ROM 14 and executes the IPL (S11). In this case, the CPU 12 reads out the legitimate hash value for the firmware 80 stored in the boot ROM 14.

Subsequently, the CPU 12 calculates the hash value for the firmware 80 (S12). More specifically, the CPU 12 inputs the firmware 80 program, and calculates the hash value of the firmware 80 on the basis of the hash function. Thereupon, the CPU 12 determines whether or not the calculated hash value matches the legitimate hash value read out from the boot ROM 14 (S13). If the values are not matching (NO at S13), then the CPU 12 suspends the system start-up process (S18). In other words, the CPU 12 does not execute the firmware 80. If the values are matching (YES at S13), then the CPU 12 reads in the firmware 80 from the flash memory 15 and executes the firmware 80 (S14).

When the firmware 80 is executed, the CPU 12 then calculates a hash value based on the partial hash values 91Ha to 9nHa of the OS 90 program, in other words, the hash value HS of the partial hash values (S15). More specifically, the CPU 12 reads out the partial hash values 91Ha to 9nHa of the plurality of partial programs 91 to 9n into which the program of the OS 90 is divided, from the flash memory 15, and taking the partial hash values 91Ha to 9nHa as input, and calculates the hash value HS of the partial hash values on the basis of the hash function. Thereupon, the CPU 12 determines whether or not the calculated hash value HS of the partial hash values matches the legitimate hash value HSa of the partial hash values read out from the flash memory 15 (S16). If the values are not matching (NO at S16), then the CPU 12 suspends the system start-up process (S18). In other words, the CPU 12 does not execute the OS 90 program. If the values are matching (YES at S16), then the CPU 12 reads out and executes the OS 90 program (S17).

In this way, based on a secure boot method according to the present embodiment, the CPU 12 does not calculate hash values based on the whole of the program of the OS 90, but rather inputs a plurality of partial hash values 91Ha to 9nHa corresponding to the partial programs 91 to 9n of the OS 90, and calculates the hash value HS of these partial hash values. The CPU 12 continues the start-up of the OS 90 if the hash value HS calculated by inputting the partial hash values 91Ha to 9nHa corresponding to the partial programs 91 to 9n of the OS 90 is the legitimate value as calculated by inputting legitimate partial hash values 91Ha to 9nHa.

In other words, based on the secure boot method according to the present embodiment, it is verified whether or not the hash value HS of the partial hash values which is calculated by inputting the plurality of partial hash values 91Ha to 9nHa corresponding to the partial programs 91 to 9n of the OS 90 is legitimate. If the value is legitimate, then it can be verified that the partial hash values 91Ha to 9nHa have not been manipulated. By verifying that the partial hash values 91Ha to 9nHa have not been manipulated, it is possible to consider that the program of the OS 90 which is expected to correspond to the partial hash values has not been manipulated.

Furthermore, based on the secure boot method according to the present embodiment, the CPU 12 does not calculate hash values by inputting the whole of the OS 90 program. Consequently, the load on the CPU 12 during start-up of the system is restricted, and the time required to calculate the hash values is greatly reduced. Therefore, the time taken by the secure boot is shortened. In general, a CPU mounted in embedded devices may not have a high processing capacity. However, with the secure boot method according to the present embodiment, it is possible to carry out a highly reliable start-up process, rapidly, even in an embedded device, by restricting the load on the CPU 12 during system start-up.

In this way, based on the secure boot method according to the present embodiment, it is possible to verify, rapidly and efficiently, that the program of an OS 90 that is to be stared up has not been manipulated. Furthermore, with the secure boot method according to the present embodiment, n partial hash values, and one legitimate hash value of the partial hash values (in other words, a total of n+1 values) are stored in the storage medium, such as a flash memory. In a general secure boot method, by contrast, one hash value is stored in the storage medium, such as a flash memory. With the secure boot according to the present embodiment, only n hash values need to be stored additionally in the storage medium, and therefore it is possible to achieve a rapid secure boot of the system by storing only a minimum amount of data in the storage medium.

The hash values of the plurality of partial programs 91 to 9n, and the legitimate hash value HSa, are acquired via an official route by a developer, or the like, when the OS 90 is updated, and are stored in a storage medium, such as the flash memory 15. If the program of the OS 90 has been manipulated by a third party, then the plurality of partial hash values 91Ha to 9nHa will not be synchronized with the program of the OS 90. Therefore, in the steps after start-up of the OS 90, it is verified whether or not the plurality of partial hash values 91Ha to 9nHa are synchronized with the program of the OS 90 that is being started up. In other words, in the steps after start-up, verification is carried out to complement the verification accuracy during start-up. Here, the steps after start up by the secure boot method will be described.

[Overview of Processing: After Start-Up]

Figure 5:
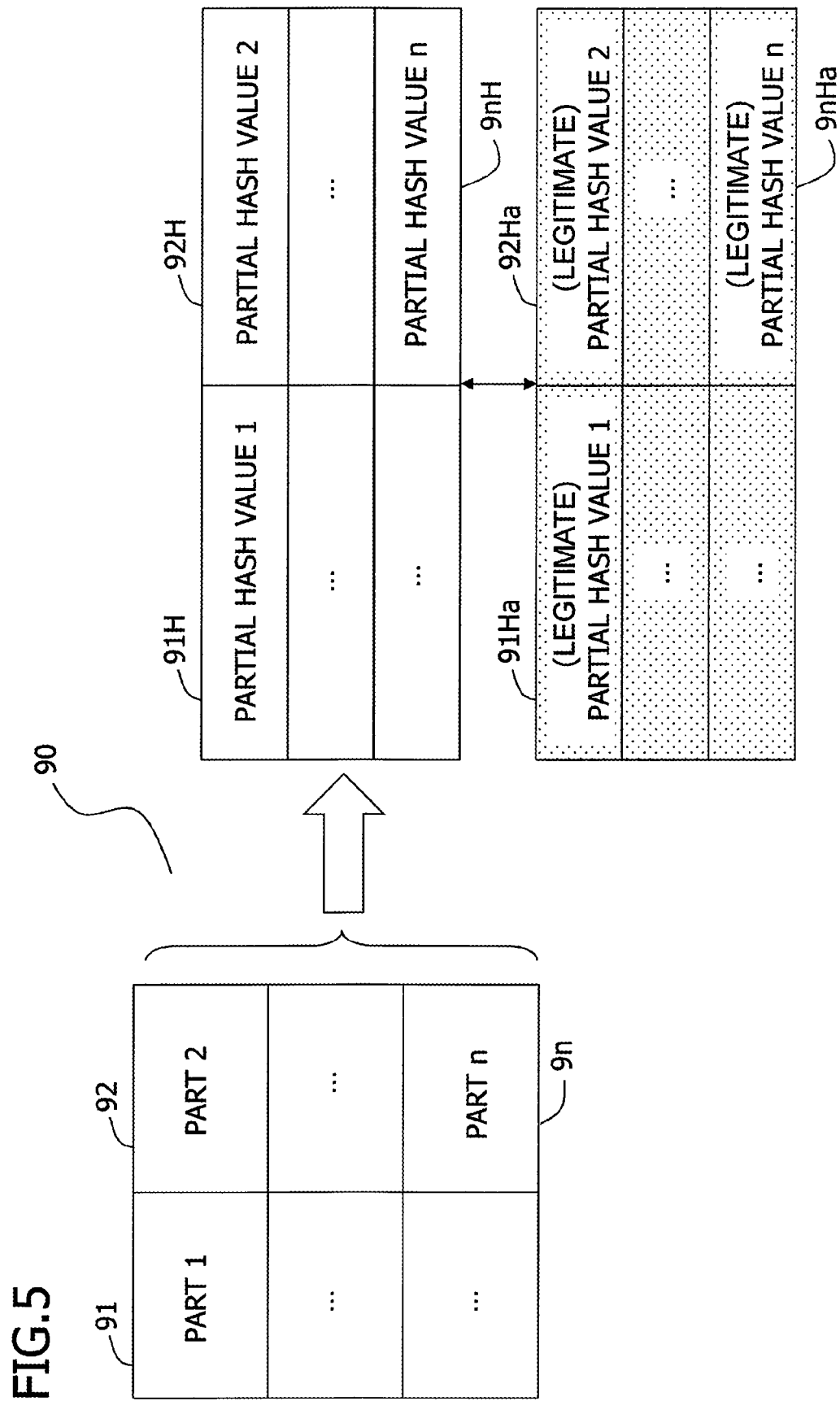
FIG. 5 is a diagram illustrating an overview of steps after start-up in a secure boot method according to the present embodiment.

FIG. 5 is a diagram illustrating an overview of steps after start-up in a secure boot method according to the present embodiment. As illustrated in FIG. 3, the secure boot method according to the present embodiment can be applied to steps after start-up of firmware 80 or an application.

In FIG. 5, in the present embodiment, after system start-up, the partial hash values 91H to 9nH of each of the n divided partial programs 91 to 9n are calculated. For example, if the OS 90 is divided into part 1 to part n, then the partial hash values of each part are calculated, as the partial hash value 91H of part 1, the partial hash value 92H of part 2, . . . , and the partial hash value 9nH of part n. The calculated partial hash values 91H to 9nH are then compared with partial hash values 91Ha to 9nHa stored previously in the flash memory 15, and if the values are the same, the execution processing of the OS 90 is continued. If the values are not the same, the execution processing of the OS 90 is suspended.

For example, a partial hash value verification application carries out the verification process for the partial hash values 91Ha to 9nHa illustrated in FIG. 5. The CPU 12 executes the partial hash value verification application at a desired timing after system start-up. The desired timing is, for example, a time when the system is idle, or timing when the system has terminated, etc. The system is idle when, for example, other processes are not running on the CPU 12 and the CPU 12 is under a light load. For instance, if the partial hash value verification application is executed when the system terminates, then the time taken for the system termination processing may become longer. The fact that the system termination processing takes a long time has little effect on performance compared to a case where the system start-up processing takes a long time. Furthermore, for example, if the partial hash value verification application is executed when the system is idle, then it is possible to verify the partial hash values 91Ha to 9nHa without having any effect on other processes.

[Flowchart: After Start-Up]

Figure 6:
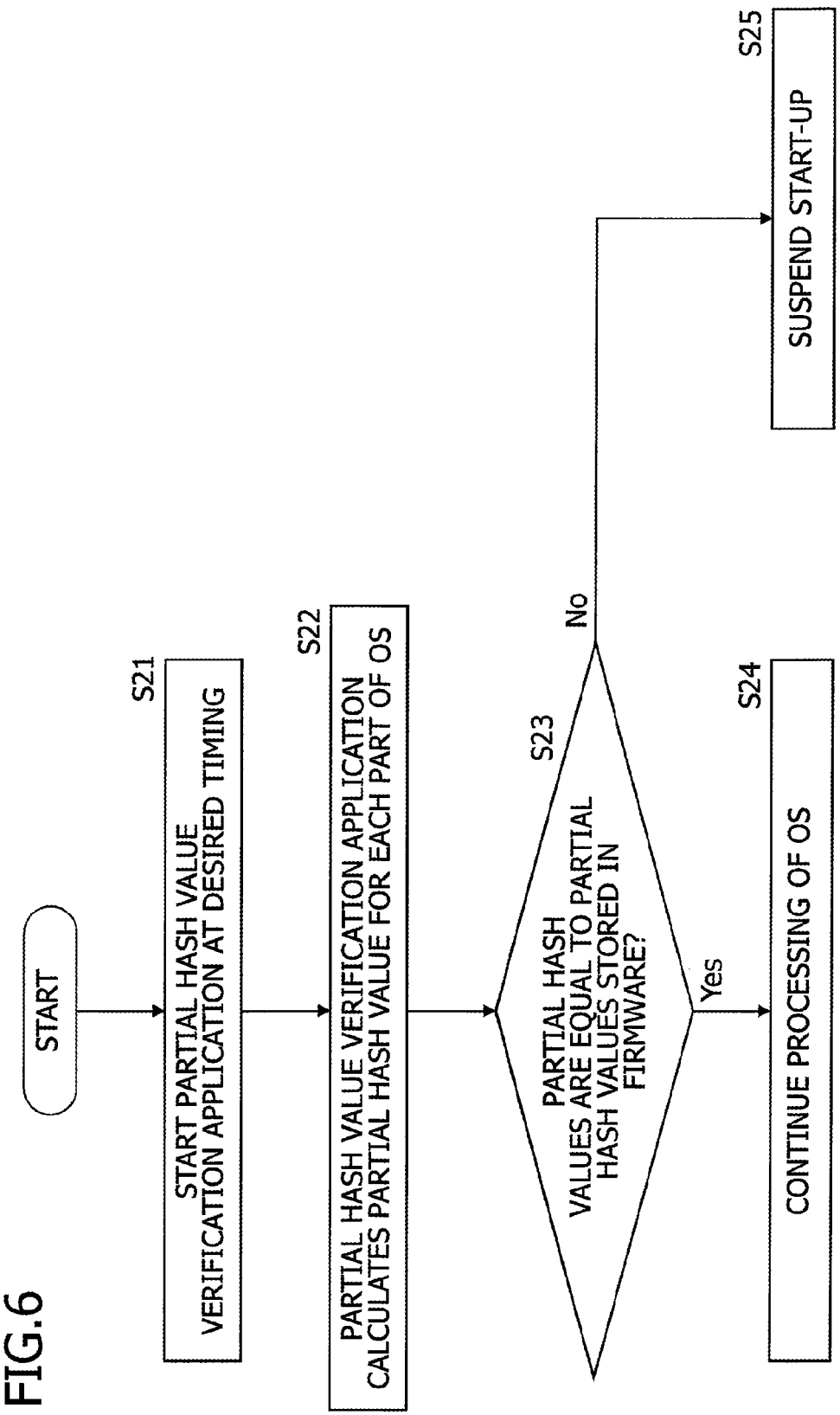
FIG. 6 is a flowchart illustrating steps after start-up in the secure boot method according to the present embodiment.

FIG. 6 is a flowchart illustrating steps after start-up in the secure boot method according to the present embodiment. The partial hash value verification application is started up at a desired timing after system start-up, when the system is idle, or when the system terminates (S21). Thereupon, the partial hash value verification application calculates the partial hash values 91H to 9nH for each of the partial programs 91 to 9n into which the OS 90 program is divided (S22). For example, if the OS 90 program has been divided into n parts, then n partial hash values 91H to 9nH are calculated.

Next, the partial hash value verification application determines whether or not the calculated plurality of partial hash values 91H to 9nH and the legitimate plurality of partial hash values 91Ha to 9nHa stored in the flash memory 15 are matching (S23). If the values are not matching (NO at S23), then the partial hash value verification application suspends the system execution processing (S25). On the other hand, if the values are matching (YES at S23), then the system execution processing continues (S24). Accordingly, it is possible to verify that the plurality of partial hash values 91Ha to 9nHa stored in the flash memory 15 are synchronized with the OS 90 that is being executed.

In this way, with the secure boot method according to the present embodiment, after system start-up, it is possible to verify whether or not the plurality of partial hash values 91Ha to 9nHa stored in a storage medium, such as the flash memory 15, correspond to the program of the OS 90 to be started up. In this way, it is possible to verify that the OS 90 that is being started up has not been manipulated, by verifying only partial hash values during system start-up. In other words, verification is performed rapidly on the basis of the partial hash values 91Ha to 9nHa when the system is started up, and furthermore, after the system has started up, it is verified that the partial hash values 91Ha to 9nHa are synchronized with the OS 90 being executed. Therefore, a secure boot can be achieved safely and rapidly in a comprehensive perspective.

In the example of the flowchart in FIG. 6, the partial hash value verification application simultaneously verifies whether or not all of the plurality of partial hash values 91Ha to 9nHa correspond to the program of the OS 90 being started up. However, the partial hash value verification application may also divide up the plurality of partial hash values 91Ha to 9nHa, at multiple timings, to verify whether or not these values correspond to the program of the OS 90 being started up. In this case, the partial hash value verification application verifies a portion of the plurality of partial hash values 91Ha to 9nHa, when the system has become idle, for example. The partial hash value verification application then successively verifies the other partial hash values, when the system becomes idle again.

Consequently, since a calculation process for all of the hash values of the plurality of partial programs 91 to 9n is not carried out in the same time band, then the load on the system caused by the calculation of partial hash values 91H to 9nH is reduced. In other words, the partial hash value verification application can verify whether or not the partial hash values 91Ha to 9nHa correspond to the program of the OS 90 being started up, while further restricting the effects on other processes.

Next, an updating process for a program in the secure boot method will be described. The updating process means the steps carried out when the program of the OS 90 is updated.

[Overview of Processing: Updating]

Figure 7:
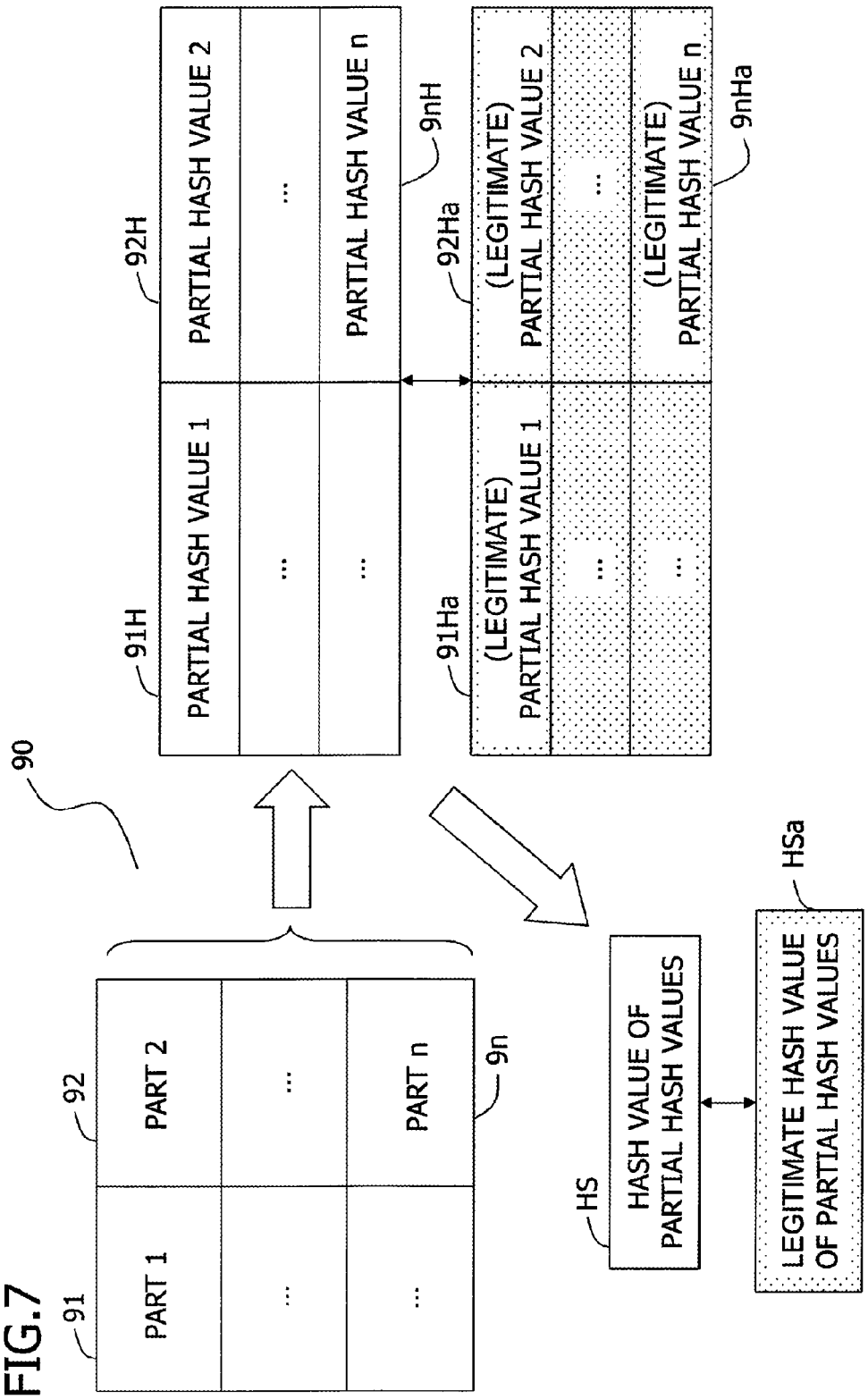
FIG. 7 is a diagram depicting an overview of an updating process in a secure boot method according to the present embodiment.

FIG. 7 is a diagram depicting an overview of an updating process in a secure boot method according to the present embodiment. In the example in FIG. 7, an updating process for the OS 90 is illustrated. Similarly to FIG. 3, the secure boot method according to the present application can also be applied to an updating process for firmware 80 or an application.

In FIG. 7, in the present embodiment, the CPU 12 acquires the legitimate partial hash values 91Ha to 9nHa and the legitimate hash value HSa of the partial hash values, by a secure method according to a an official route, when updating the OS 90. Furthermore, in the updating process, the CPU 12 calculates the plurality of partial hash values 91H to 9nH on the basis of the partial programs 91 to 9n of the updated program of the OS 90, and verifies whether or not these calculated values match the acquired plurality of partial hash values 91Ha to 9nHa. If the values do not match, then it is determined that the updating process has failed. If the values do not match, then this means that in the course of updating, the new program of the OS 90, or the partial hash values 91Ha to 9nHa, have been manipulated. On the other hand, if the values are matching, then the plurality of partial hash values 91H to 9nH are stored inside the firmware 80.

Furthermore, the CPU 12 also calculates the hash value HS of the partial hash values, on the basis of the calculated partial hash values 91H to 9nH, and verifies whether or not this calculated value matches the legitimate hash value HSa of the partial hash values that has been acquired. If the values do not match, then this means that, in the course of updating, the new program of the OS 90, and the acquired partial hash values 91Ha to 9nHa, or the legitimate hash value HSa of the partial hash values, have been manipulated. If the values are matching, then the hash value HS of the partial hash values is stored inside the firmware 80.

[Flowchart: Updating]

Figure 8:
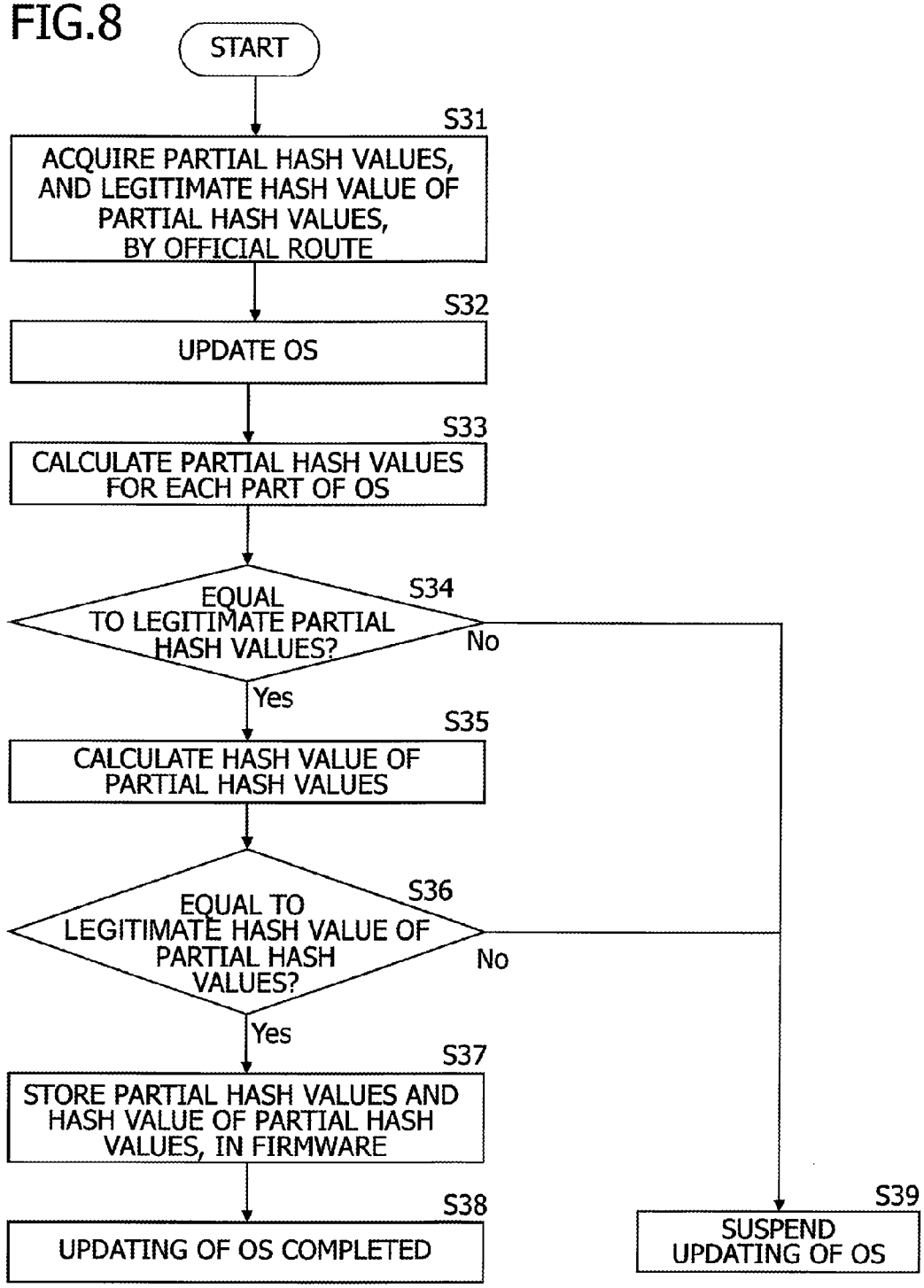
FIG. 8 is a flowchart depicting an updating process in a secure boot method according to the present embodiment.

FIG. 8 is a flowchart depicting an updating process in a secure boot method according to the present embodiment. In the updating process, firstly, the CPU 12 inputs legitimate partial hash values 91Ha to 9nHa corresponding to the program of the OS 90 o be updated, and the legitimate hash value HSa of the partial hash values, by means of an official route (S31). Thereupon, the program of the OS 90 is updated (S32).

Thereupon, the CPU 12 calculates the partial hash values 91H to 9$n$H, for each of the new partial programs 91 to 9$n$ into which the new program of the OS 90 is divided (S33). The CPU 12 then determines whether or not the calculated plurality of partial hash values 91H to 9$n$H and the legitimate plurality of partial hash values 91Ha to 9$n$Ha stored in a storage medium, such as the flash memory 15, are matching (S34). If the values are not matching (NO at S34), then the CPU 12 suspends the updating process for the OS 90 (S39). On the other hand, if the values are matching (YES at S34), then the CPU 12 calculates a hash value for the plurality of partial hash values 91H to 9$n$H, in other words, a hash value HS of the partial hash values (S35).

The CPU 12 then determines whether or not the calculated hash value HS of the partial hash values and the legitimate hash value HSa of the partial hash values stored in the storage medium, such as the flash memory 15, are matching (S36). If the values are not matching (NO at S36), then the CPU 12 suspends the updating process for the OS 90 (S39). On the other hand, if the values are matching (YES at S36), then the CPU 12 stores the partial hash values 91H to 9$n$H, and the hash value HS of the partial hash values, in the firmware 80 (S37). Thereby, the updating process for the OS 90 is completed (S38).

In the example of the flowchart illustrated in FIG. 8, the CPU 12 calculates the partial hash values 91H to 9$n$H and the hash value HS of the partial hash values, and determines whether or not these respectively match the legitimate partial hash values 91Ha to 9$n$Ha and the legitimate hash value HSa of the partial hash values which have been obtained by an official route. However, the CPU 12 may also carry out verification of the partial hash values 91H to 9$n$H and the legitimate hash value HS of the partial hash values, in a step after re-start following the updating process.

Figure 9:
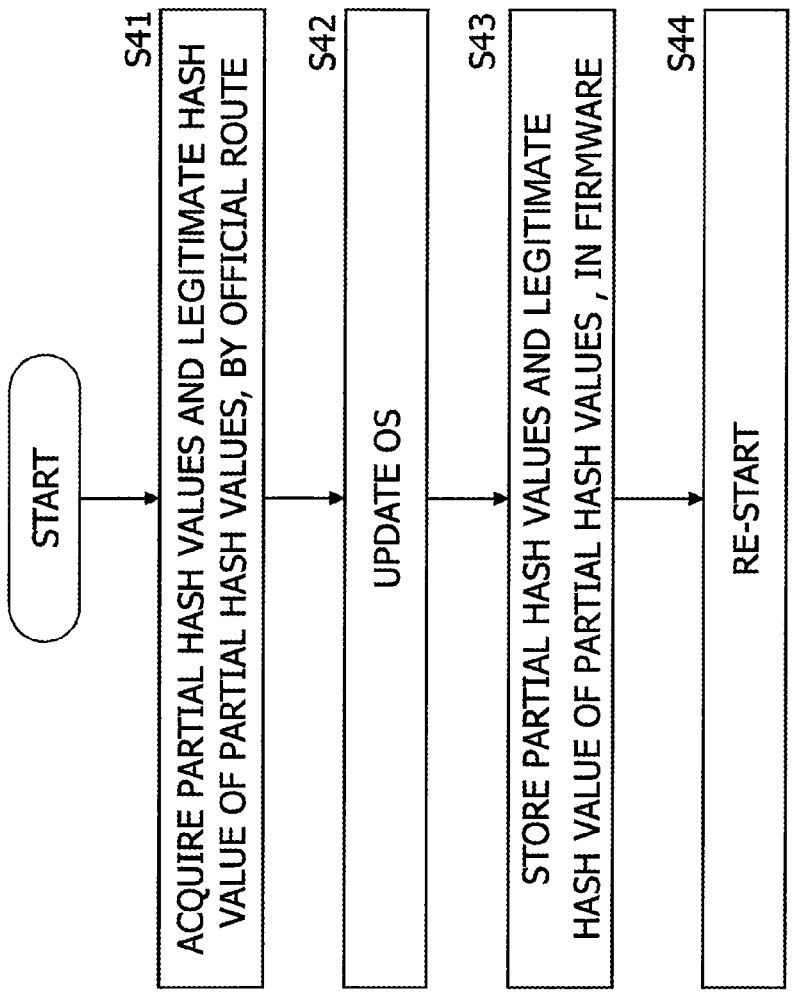
FIG. 9 is a second flowchart illustrating an updating process in a secure boot method according to the present embodiment.

FIG. 9 is a second flowchart illustrating an updating process in a secure boot method according to the present embodiment. Similarly to the flowchart depicted in FIG. 8, in the updating process, firstly, the CPU 12 acquires a plurality of partial hash values 91H to 9$n$H corresponding to the program of the OS 90 that is to be updated, and the legitimate hash value HSa of the partial hash values, by an official route (S41). Thereupon, the CPU 12 updates the OS 90 program (S42). The acquired legitimate plurality of partial hash values 91Ha to 9$n$Ha and the legitimate hash value HSa of the partial hash values are then stored in a storage medium, such as the flash memory 15 (S43). Subsequently, the OS 90 is re-started (S44).

In the flowchart in FIG. 9, verification of the partial hash values 91H to 9$n$H and the hash value HS of the partial hash values is not carried out. However, when the OS 90 is re-started (S44), the CPU 12, in the start-up process for the OS 90, calculates the hash value HS of the partial hash values on the basis of the updated plurality of partial hash values 91Ha to 9$n$Ha, and verifies whether or not this calculated value matches the legitimate hash value HSa of the updated partial hash values. Thereupon, in a step after start-up of the OS 90, the CPU 12 verifies whether or not the updated plurality of partial hash values 91Ha to 9$n$Ha correspond to the program of the OS 90 being started up, by a partial hash value verification application.

In this way, based on the secure boot method according to the present embodiment, the partial hash values 91H to 9$n$H and the hash value HS of the partial hash values, which have been updated by the updating process, may be verified in the updating process, or may be verified after re-start. Consequently, even if the program has been updated, it is possible to achieve a safe and rapid secure boot on the basis of the new program and a new plurality of partial hash values 91Ha to 9Ha and a new legitimate hash value HSa of the partial hash values.

As described above, in the secure boot method according to the present embodiment, the system includes a processor (CPU) 12, and a storage medium which stores a program, a plurality of first partial hash values 91Ha to 9$n$Ha of a plurality of partial programs into which the program is divided, and a (first) legitimate hash value HSa which is a hash value calculated based on a plurality of first legitimate partial hash values which are calculated based on a plurality of legitimate partial programs into which a legitimate program is divided. Furthermore, at system start-up, the secure boot method includes calculation step for calculating a (second) calculated hash value HS based on the first partial hash values, namely, the hash value of the plurality of first partial hash values 91Ha to 9$n$Ha stored in the storage medium, and determining step. In the determining step, the processor 12 determines whether or not the (second) calculated hash value HS of the partial hash values matches the (first) legitimate hash value HSa of the partial hash values, and continues the system start-up process when the determination indicates match, or suspends the system start-up process when the determination does not indicate match.

In this way, based on the secure boot method according to the present embodiment, the CPU 12 verifies whether or not the hash value HS of the partial hash values, which is the hash value of the plurality of partial hash values 91Ha to 9$n$Ha corresponding to the partial programs 91 to 9$n$ of the OS 90, is legitimate. By this means, it is possible to verify whether or not the partial hash values have been manipulated. By verifying that the partial hash values 91Ha to 9$n$Ha have not been manipulated, it is possible to consider that the program of the OS 90 which is expected to correspond to the partial hash values has not been manipulated.

Furthermore, the CPU 12 does not calculate hash values by inputting the whole of the program of the OS 90, and therefore the load on the CPU 12 in the system start-up is suppressed. Consequently, the time taken to calculate the hash values can be reduced greatly, and a secure boot can be performed rapidly. In general, a CPU installed in an embedded device may not have a high processing capacity, but by suppressing the load on the CPU 12 during system start-up, it is possible to achieve rapid and secure start-up, even in an embedded device.

In this way, based on the secure boot method according to the present embodiment, it is possible to verify, in a rapid and simple fashion, that the program of the OS 90 to be started up has not been manipulated. Therefore, the security of the boot can be guaranteed by verifying the authenticity of the program in question, as well as shortening the start-up time.

Furthermore, the secure boot method according to the present embodiment includes, after system start-up, calculation step in which the processor calculates a plurality of second partial hash values 91H to 9$n$H, which are hash values calculated based on a plurality of second partial programs 91 to 9$n$ into which the program of the system that is being started up is divided, and a determining step. In the determining step, the processor determines whether or not the calculated plurality of second partial hash values 91H to 9$n$H match the plurality of first partial hash values 91Ha to 9$n$Ha stored in the storage medium, and continues the system execution processing when the determination indicates match, or suspends the system execution processing when the determination does not indicate match.

In this way, according to the secure boot method of the present embodiment, after system start-up, it is verified that the plurality of the partial hash values 91Ha to 9nHa stored in the system are synchronized with the program that is being started up. Consequently, with the secure boot method according to the present embodiment, it is possible to achieve a relatively rapid secure boot, by verifying that the partial hash values 91Ha to 9nHa correspond to the program being started up, after system start-up, while enabling rapid verification on the basis of the stored partial hash values 91Ha to 9nHa during system start-up.

In the secure boot method according to the present embodiment, the calculation step and the determining step are carried out in a time-divided manner, with respect to all of the plurality of second partial programs. Therefore, for example, if the steps are carried out in the time-divided manner, then the system is prevented from calculating hash values for all of the plurality of partial programs 91 to 9n in the same time band, and consequently the load on the system relating to the partial hash values 91H to 9nH is reduced.

Furthermore, in the secure boot method according to the present embodiment, the calculation step and the determining step are carried out after system start-up when the system is in a low-load state. The system is in the low-load state when the system is in an idle state and/or when the system has terminated. Therefore, the secure boot method according to the present embodiment enables verification of the partial hash values 91Ha to 9nHa, without placing a load on the system after start-up, while achieving a rapid secure boot. In other words, a rapid secure boot can be achieved without affecting other processes.

Moreover, the secure boot method according to the present embodiment includes updating step in which the processor (CPU) 12 updates the program of the system to a new program, acquisition step in which the processor acquires the plurality of first partial hash values 91Ha to 9nHa corresponding to the new program, and a (first) legitimate hash value HSa, corresponding to the new program, calculation step and determining step. In the calculation step, the processor calculates a plurality of third partial hash values 91H to 9nH based on a plurality of third partial programs 91 to 9n into which the updated new program is divided, and a (third) calculated hash value HS based on the calculated plurality of third partial hash values. In the determining step, the processor determines both whether or not the calculated plurality of third partial hash values 91H to 9nH match the acquired plurality of first partial hash values 91Ha to 9nHa, and whether or not the (third) calculated hash value HS matches the (first) legitimate hash value HSa, continues an updating process of the system when both of the two determinations indicate match, and suspends the updating process of the system when at least one of the two determinations does not indicate match.

Consequently, based on the secure boot method according to the present embodiment, in the updating process, the plurality of partial hash values 91Ha to 9nHa corresponding to a new program, and the legitimate hash values HSa of the partial hash values, are acquired. It is then verified whether or not the acquired plurality of partial hash values 91Ha to 9nHa and the legitimate hash value HSa of the partial hash values correspond to the updated program in the updating process. By this means, even after the program has been updated, a rapid and safe secure boot can be achieved on the basis of the new program, a plurality of partial hash values 91Ha to 9nHa corresponding to the new program, and a legitimate hash value HSa of the partial hash values.

Furthermore, the secure boot method according to the present embodiment includes updating step in which the processor updates the program of the system to a new program, acquisition step in which the processor acquires the plurality of first partial hash values 91Ha to 9nHa and a (first) legitimate hash value HSa, corresponding to the new program, and instructing step in which the processor instructs a re-start of the system.

Consequently, based on the secure boot method according to the present embodiment, in an updating process, the plurality of partial hash values 91Ha to 9nHa corresponding to the new program and the legitimate hash value HSa of the partial hash values, are acquired and are verified during re-start. More specifically, in a start-up step of the program during re-start, it is verified whether or not the plurality of partial hash values 91Ha to 9nHa correspond to the legitimate hash value HSa of the partial hash values. Furthermore, in a step after system start-up, it is verified whether or not the plurality of partial hash values 91Ha to 9nHa correspond to the program being executed. Consequently, it is possible to achieve a rapid and safe secure boot on the basis of the new program, the plurality of partial hash values 91Ha to 9nHa corresponding to the new program, and the legitimate hash value HSa of the partial hash values, as well as performing a rapid updating process.

The present embodiment has been described with reference to an example in which an OS started up after firmware is verified on the basis of the hash values of partial programs. However, it is also possible to carry out verification in a similar fashion for firmware also, on the basis of hash values for partial programs. Consequently, the start-up time for the firmware can also be shortened, in addition to the OS 90, and therefore an even more rapid system start-up time can be achieved.

[Second Embodiment]

In the first embodiment, a case is described in which n partial hash values 91Ha to 9nHa correspond to one calculated hash value HS of the partial hash values. However, the invention is not limited to this example. For example, it is also possible to calculate one hash value of the partial hash values, respectively, by inputting m partial hash values, of the n partial hash values 91Ha to 9nHa. In other words, in this case, a plurality of hash values HS of the partial hash values are calculated, in respect of the n partial hash values 91Ha to 9nHa.

Figure 10:
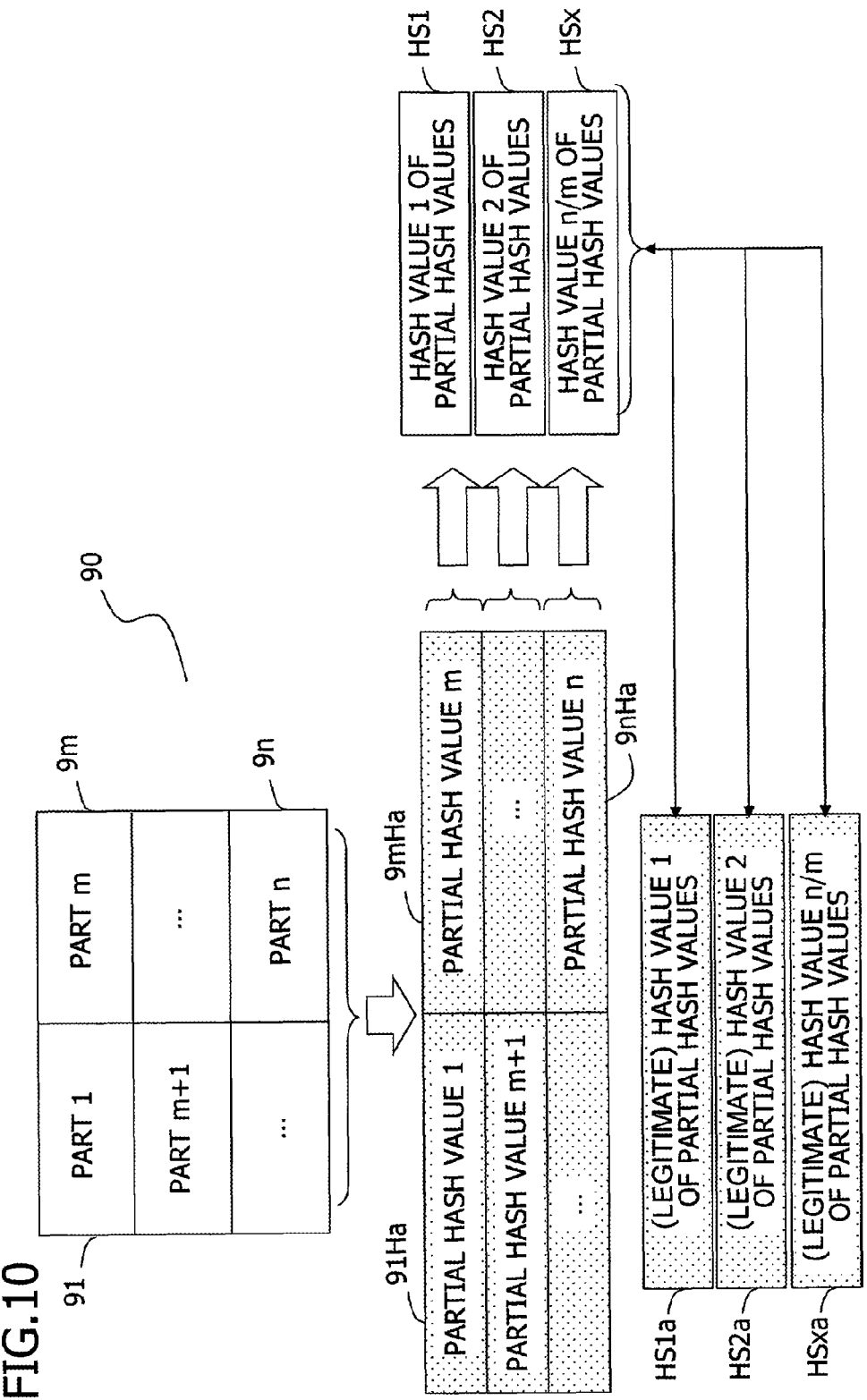
FIG. 10 is a diagram illustrating an overview of the steps during start-up in a secure boot method according to the second embodiment.

FIG. 10 is a diagram illustrating an overview of the steps during start-up in a secure boot method according to the second embodiment. As illustrated in FIG. 10, in the second embodiment, n partial hash values 91Ha to 9nHa and n/m legitimate hash values HS1 to HSx of the partial hash values are stored inside the firmware 80. For example, in the second embodiment, m partial hash values are input to the hash function, and one hash value of these partial hash values is calculated. The n/m hash values HS1 to HSx of the partial hash values thus calculated are compared with the previously stored n/m legitimate hash values HS1a to HSxa of the partial hash values, and if the values are matching, the OS 90 is started up.

More specifically, for example, a case where n=6 and m=2 will now be explained. In this case, six legitimate partial hash values corresponding to the OS 90 program that has been divided into six parts are previously stored inside the firmware 80. In the start-up process of the OS 90, one hash value of the partial hash values is calculated respectively for two partial hash values. Consequently, three hash values of the partial hash values are calculated, in respect of the six partial hash values, and these are compared with three legitimate hash values of the partial hash values which are stored inside the firmware 80. If all of the hash values of the partial hash values are matching, then the OS 90 is started up.

However, the invention is not limited to this example. If n=6, then, for example, then it is also possible to calculate one hash value of the partial hash values in respect of four of the partial hash values, and to calculate one hash value of the partial hash values in respect of two of the partial hash values. Consequently, two hash values of the partial hash values are calculated in respect of the six partial hash values, and are compared with two legitimate hash values of the partial hash values stored inside the firmware 80. If all of the hash values of the partial hash values are matching, then the OS 90 is started up.

[Flowchart: Start-Up]

Figure 11:
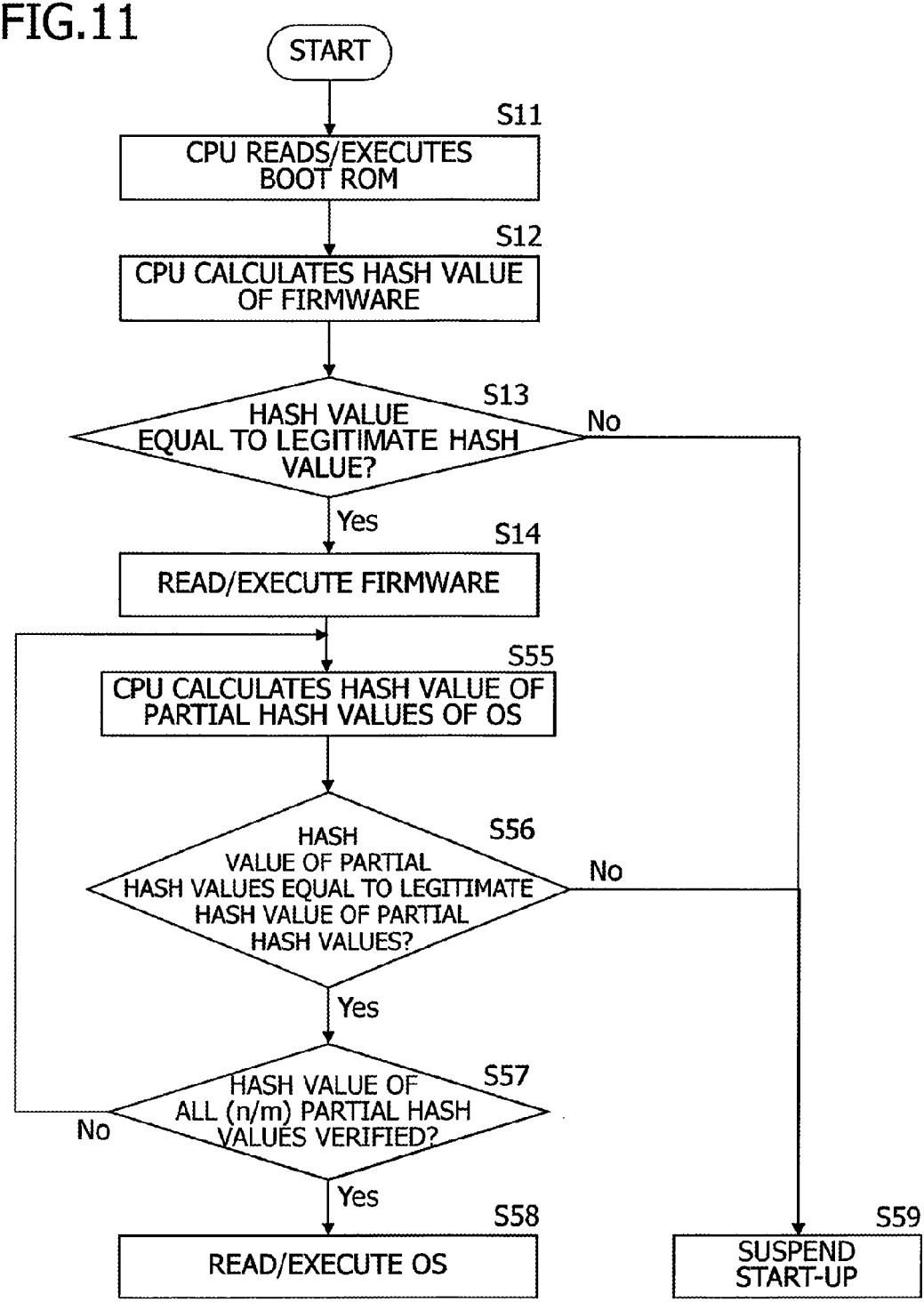
FIG. 11 is a flowchart illustrating steps during start-up of a secure boot method according to the second embodiment.

FIG. 11 is a flowchart illustrating steps during start-up of a secure boot method according to the second embodiment. The processing in steps S11 to S14 in the flowchart in FIG. 11 is similar to the flowchart in FIG. 4 relating to the first embodiment.

In the flowchart in FIG. 11, the CPU 12 repeats a calculation step (S55) for calculating the hash values HS1 to HSx of the partial hash values, and a comparison step (S56) for comparing with the legitimate hash values HS1a to HSxa of the partial hash values, and the number of repetitions performed by the CPU 12 corresponds to the number of hash values of the partial hash values. Therefore, the CPU 12 determines whether or not the calculated hash value matches the legitimate hash value of the partial hash values, in respect of all of the (n/m) hash values of the partial hash values (S57). If verification has been completed (YES at S57), then the CPU 12 reads in and executes the program of the OS 90 (S58). On the other hand, if the verification is not yet completed (NO at S57), then the CPU 12 calculates the hash values of the partial hash values that have not yet been verified (S55), and then performs verification thereof (S56).

Next, an overview of the steps after start-up in the secure boot method according to the second embodiment will be described.

[Overview of Processing: After Start-Up]

Figure 12:
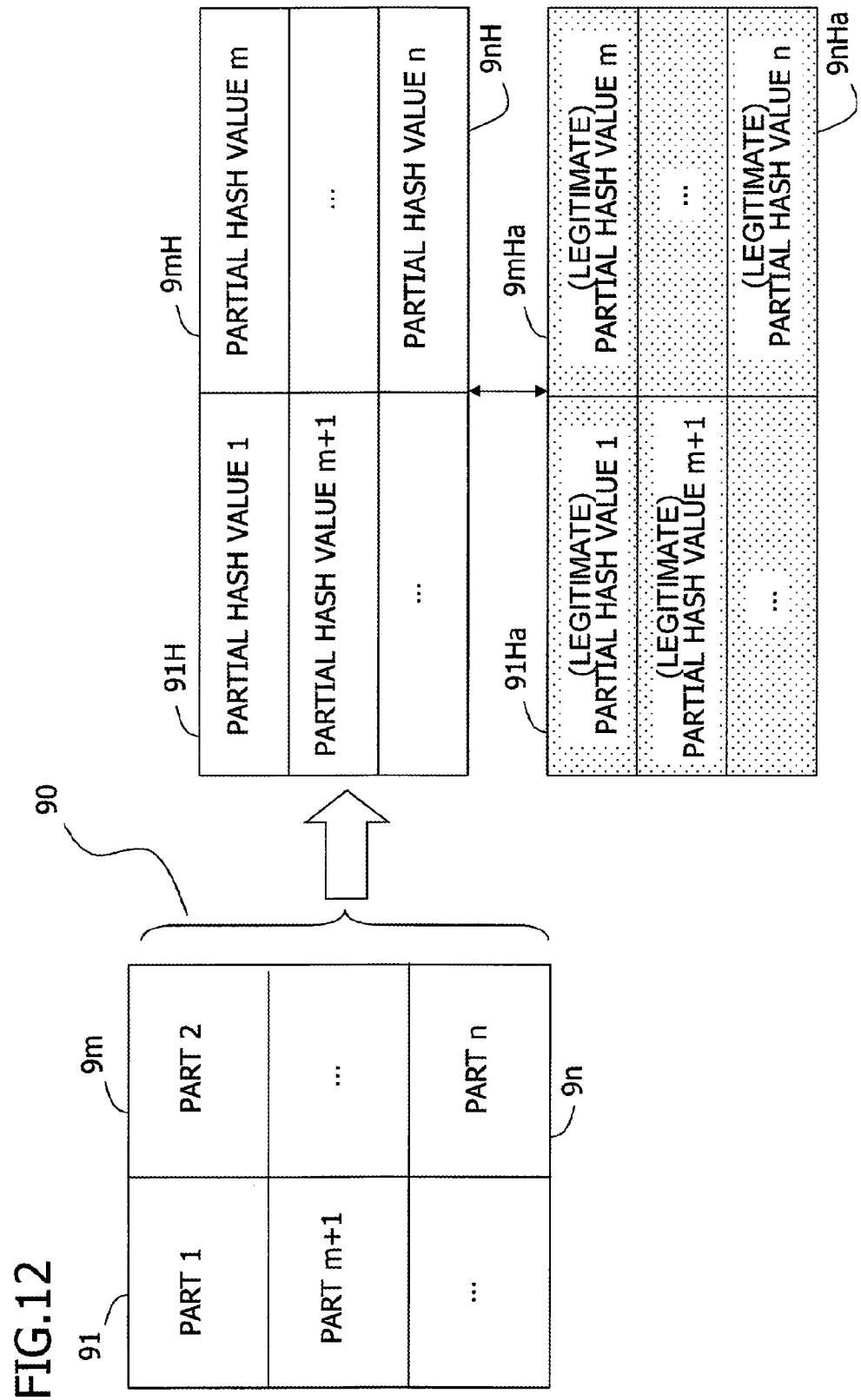
FIG. 12 is a diagram illustrating an overview of steps after start-up in the secure boot method according to the second embodiment.

FIG. 12 is a diagram illustrating an overview of steps after start-up in the secure boot method according to the second embodiment. The processing after system start-up in the second embodiment is similar to the first embodiment. After system start-up, the CPU 12 calculates n partial hash values 91H to 9nH on the basis of the n divided partial programs 91 to 9n. The CPU 12 compares the calculated n partial hash values 91H to 9nH, with n partial hash values 91Ha to 9nHa stored previously in the flash memory 15. If the hash values are the same, then the execution process of the OS 90 is continued, and if the hash values are not the same, then the execution process of the OS 90 is suspended. The flowchart for describing the processing after start-up in the secure boot method according to the second embodiment is similar to the flowchart in FIG. 6 relating to the first embodiment.

Next, an overview of a program updating process in a secure boot method according to the second embodiment will be described.

[Overview of Processing: Updating]

Figure 13:
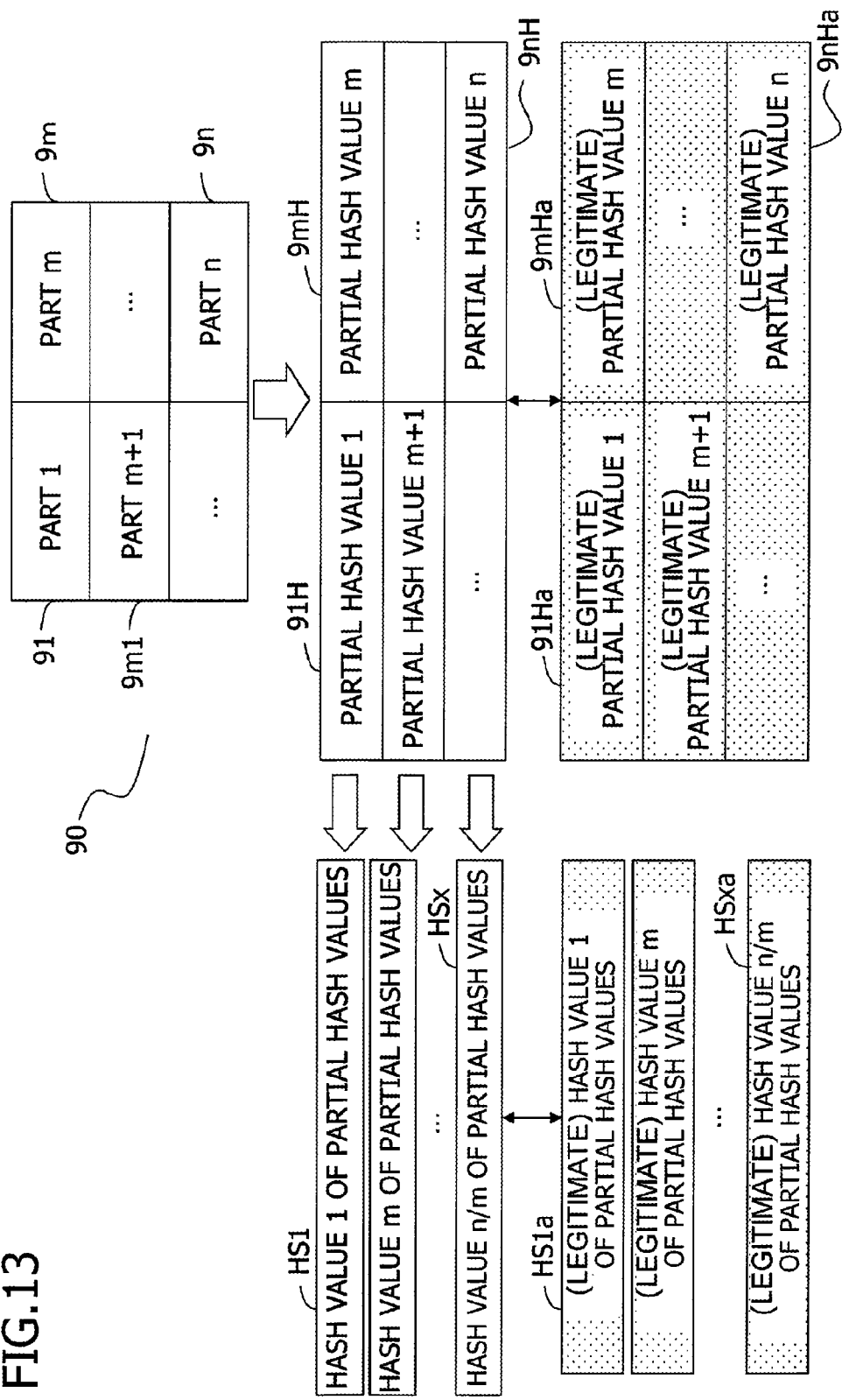
FIG. 13 is a diagram depicting an overview of an updating process in the secure boot method according to the second embodiment.

FIG. 13 is a diagram depicting an overview of an updating process in the secure boot method according to the second embodiment. In the second embodiment, the CPU 12 acquires n partial hash values 91Ha to 9nHa, and n/m legitimate hash values HS1a to HSxa of the partial hash values, by an official route, when the OS 90 is updated.

Furthermore, for example, in the updating process, the CPU 12 calculates n partial hash values 91H to 9nH on the basis of the partial programs 91 to 9n of the updated program of the OS 90, and verifies whether or not these calculated values match the acquired n partial hash values 91Ha to 9nHa. The CPU 12 then calculates n/m hash values HS1 to HSx of the partial hash values on the basis of the calculated n partial hash values 91H to 9nH, and verifies whether or not these calculated values match the acquired n/m legitimate hash values HS1a to HSxa of the partial hash values.

[Flowchart: Updating]

Figure 14:
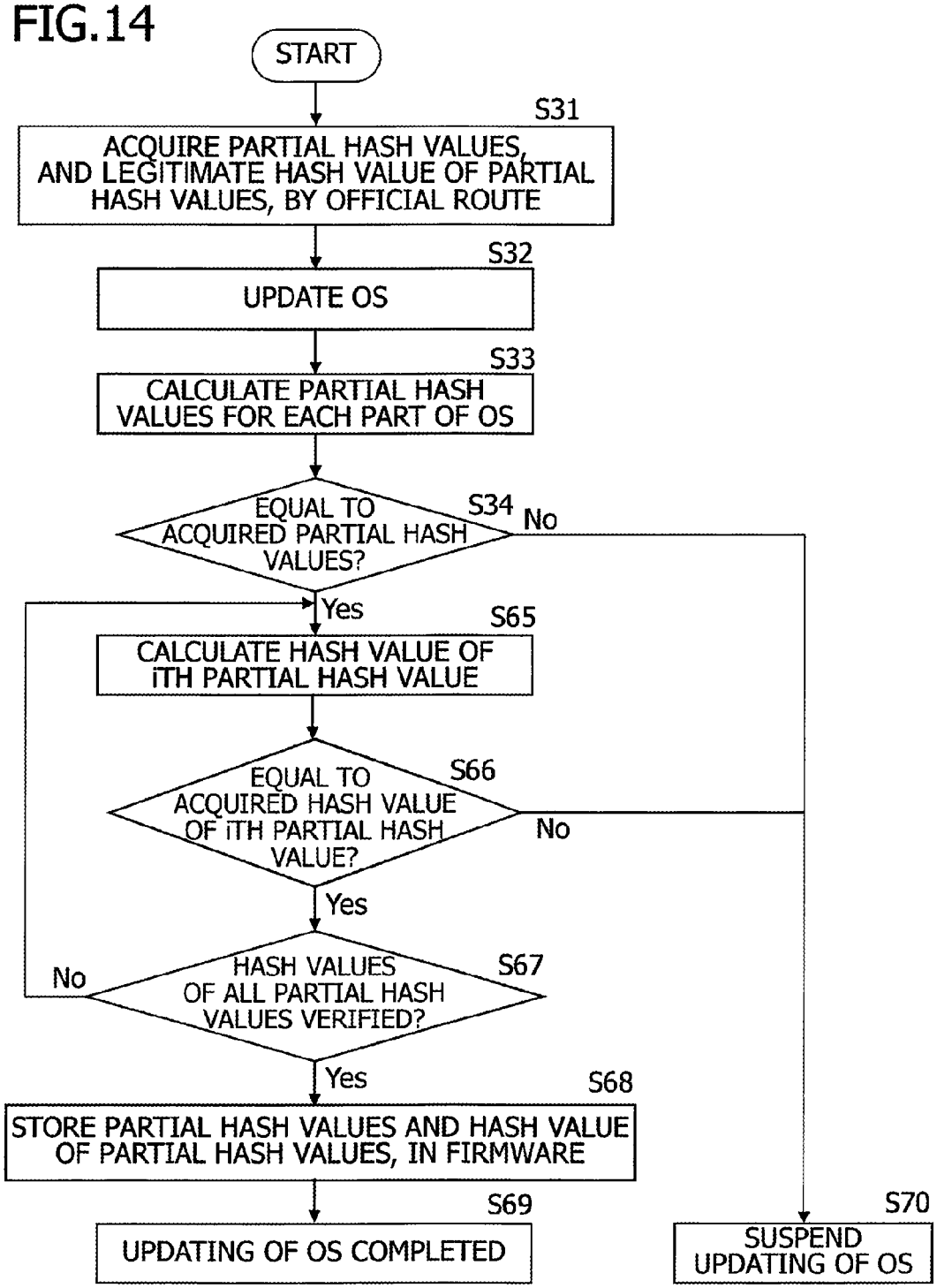
FIG. 14 is a flowchart illustrating an updating process in a secure boot method according to the second embodiment.

FIG. 14 is a flowchart illustrating an updating process in a secure boot method according to the second embodiment. The processes in steps S31 to S34 in the flowchart in FIG. 14 are similar to the flowchart in FIG. 8 according to the first embodiment.

If the calculated plurality of partial hash values 91H to 9nH and the plurality of partial hash values 91Ha to 9nHa corresponding to the new program are matching in the flowchart in FIG. 14 (YES at S34), then the CPU 12 calculates a hash value of the ith partial hash value (S65). The CPU 12 determines whether or not the calculated hash value of the ith partial hash value and the legitimate hash value of the ith partial hash value corresponding to the new program are matching (S66). If the values are not matching (NO at S66), then the updating process of the OS 90 is suspended (S70).

On the other hand, if the values are matching (YES at S66), then the CPU 12 determines whether or not verification has been completed in respect of the hash values of all of the partial hash values (S67). If verification has been completed (YES at S67), then the CPU 12 stores the n partial hash values 91H to 9nH and the n/m hash values HS1 to HSx of the partial hash values, in the firmware 80 (S68). Thereby, the updating process of the OS 90 is completed (S69). On the other hand, if the verification has not yet been completed (NO at S67), then the CPU 12 calculates the hash values of the partial hash values that have not yet been verified (S65), and carries out verification (S66).

Furthermore, similarly to the first embodiment, the partial hash values 91H to 9nH and the hash value HS of the partial hash values may also be verified after re-start following an updating process. The flowchart in the case of verification after re-start is similar to the flowchart in FIG. 9 according to the first embodiment.

In this way, n/m calculated hash values HS1 to HSx of the partial hash values may correspond to the n partial hash values 91Ha to 9nHa. In the second embodiment also, similarly to the first embodiment, it is possible to verify, in a rapid and simple fashion, that the program of the OS 90 to be started up has not been manipulated. Thereby, the security of the boot is guaranteed by verifying the authenticity of the program in question, and the start-up time can also be shortened.

Furthermore, in the second embodiment also, after system start-up, the CPU 12 determines whether or not the plurality of partial hash values 91Ha to 9nHa stored in the system correspond legitimately to the program being started up. Thereby, the secure boot method according to the present embodiment can achieve a rapid secure boot in a comprehensive perspective, by enabling rapid verification on the basis of the partial hash values 91Ha to 9nHa during system start-up, while verifying that the partial hash values 91Ha to 9nHa correspond to the program being started up, after system start-up.

Furthermore, in the second embodiment also, in the updating step, n partial hash values 91Ha to 9nHa corresponding to the new program, and n/m legitimate hash values of these partial hash values, are acquired. It is then verified, in the updating step, whether or not the n partial hash values 91Ha to 9nHa and n/m legitimate hash values of the hash values correspond to the updated program. Alternatively, it can be verified whether or not the n partial hash values 91Ha to 9nHa correspond to the n/m legitimate hash values of the hash values, and whether or not the n partial hash values 91Ha to 9nHa correspond to the program being executed, during re-start following the updating step. Consequently, even if the program has been updated, it is possible to achieve a safe and rapid secure boot on the basis of the new program, the plurality of partial hash values 91Ha to 9nHa corresponding to the new program, and the legitimate hash values HS1a to HSxa of the partial hash values.

The respective steps of the secure boot method according to the present embodiment may be achieved by hardware.

Figure 15:
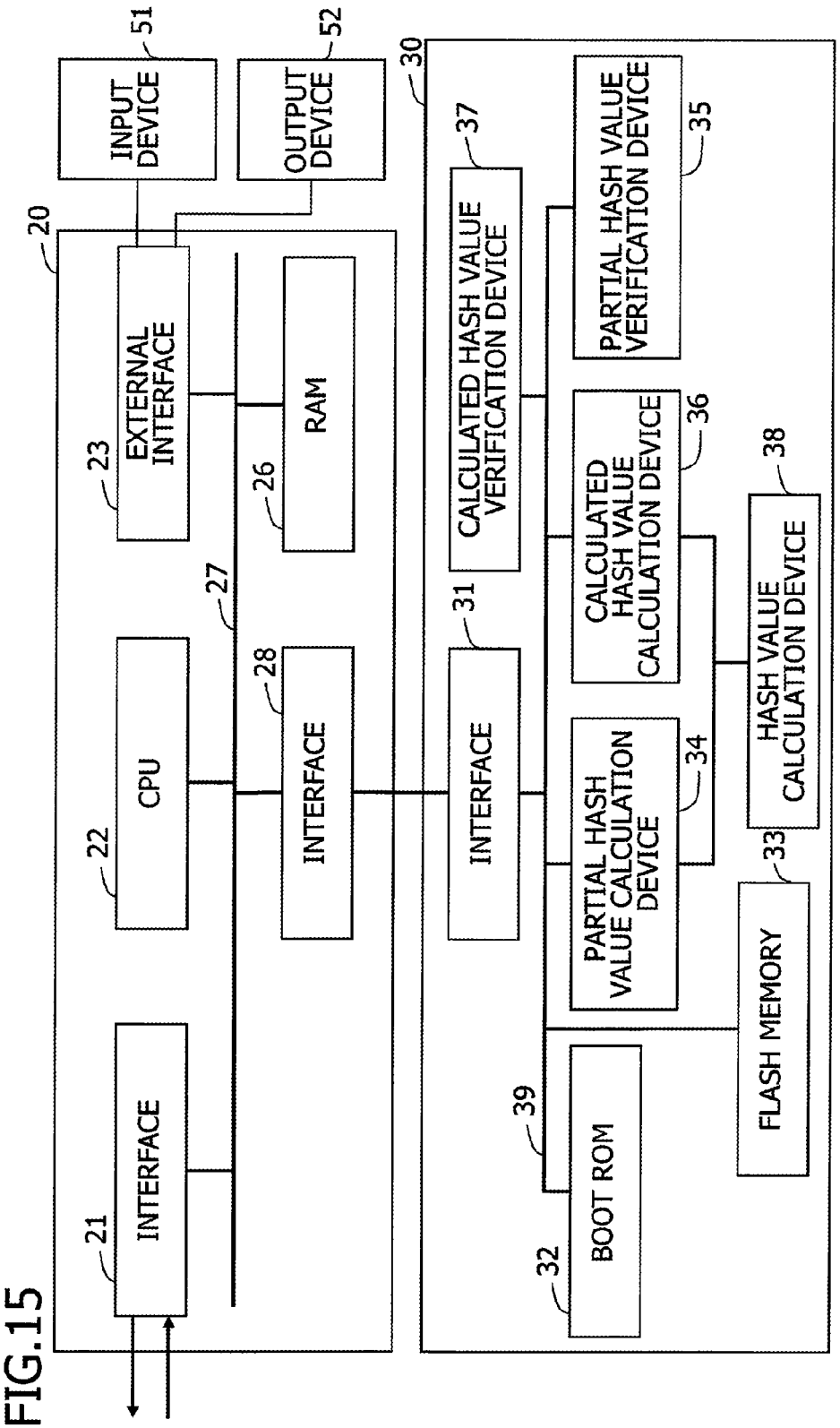
FIG. 15 is one example of the composition of a semiconductor device in a case where the secure boot method according to the present embodiment is achieved by hardware.

FIG. 15 is one example of the composition of a semiconductor device in a case where the secure boot method according to the present embodiment is achieved by hardware. The semiconductor device in FIG. 15 includes two semiconductor devices 20 and 30, for example. The first semiconductor device 20 includes, for example, a CPU 22, a RAM 26, an interface 21, an external interface 23, and an interface 28 with the second semiconductor device 30. These respective units are mutually connected via a bus 27. The interface 21 controls input and output of data from and to external devices, and the external interface 23 controls input and output of data from and to an input device 51 and an output device 52.

Furthermore, the second semiconductor device 30 in FIG. 15 includes, for example, a boot ROM 32, a flash memory 33, a partial hash value calculation device 34, a calculated hash value calculation device 36, a partial hash value verification device 35, a calculated hash value verification device 37, and a hash value calculation device 38. The respective units are mutually connected via a bus 39. As illustrated above in FIG. 1, the boot ROM 32 stores an IPL program, and a device driver start-up program for the flash memory 33, and the like. Furthermore, the flash memory 33 stores firmware 80 and OS 90 programs, and hash values for the secure boot, and so on.

The partial hash value calculation device 34 in FIG. 15 calculates the hash values of the plurality of partial programs, in other words, the partial hash values. The partial hash value verification device 35 verifies whether or not the plurality of partial hash values correspond to the programs. Furthermore, the calculated hash value calculation device 36 calculates a hash value for a plurality of partial hash values. The calculated hash value verification device 37 verifies whether or not the partial hash values have been manipulated. The hash value calculation device 38 is a device for calculating hash values, and is controlled by the partial hash value calculation device 34 and the calculated hash value calculation device 36.

In the second semiconductor device 30, when it is detected via the interface 31 that the power to the embedded device has been switched on, the IPL is executed on the basis of a boot loader of the boot ROM 32, and furthermore the processing during start-up as described in relation to the first and second embodiments is carried out in accordance with the calculated hash value calculation device 36, and the calculated hash value verification device 37. Furthermore, after start-up, the processing after start-up as described in relation to the first and second embodiments is carried out in accordance with the partial hash value calculation device 34 and the partial hash value verification device 35.

As FIG. 15, by achieving the respective steps of the secure boot method according to the present embodiment by hardware, the load on the CPU 12 is lightened. Consequently, the CPU 12 is able to execute other processes during system start-up, and therefore a secure boot can be carried out more rapidly. Therefore, the semiconductor device can achieve a more rapid secure boot, as well as being able to verify, in a simple fashion, that the program to be started up has not been manipulated, on the basis of the partial hash values.

A case has been described here in which a secure boot method according to the present embodiment is applied to an embedded device, but the secure boot method according to the present embodiment can also be applied to a general PC, or the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A secure boot method for a system, the system including: a processor; and a storage medium configured to store a program, a plurality of first partial hash values calculated based on a plurality of first partial programs into which the program is divided, and a first legitimate hash value which is a hash value calculated based on a plurality of first legitimate partial hash values, the plurality of first legitimate partial hash values being calculated based on a plurality of legitimate partial programs into which a legitimate program is divided, the legitimate program corresponding to the program;

the secure boot method comprising:
  calculating, by the processor, during start-up of the system, a second calculated hash value based on the plurality of first partial hash values which has been already calculated and stored in the storage medium before the start-up of the system; and
  determining, by the processor, during the start-up of the system, whether or not the second calculated hash value matches the first legitimate hash value to continue the start-up processing of the system when the determination indicates match, and suspend the start-up processing of the system when the determination does not indicate match.

2. The secure boot method according to claim 1, further comprising:
  calculating, by the processor, after the start-up of the system, a plurality of second partial hash values, which are hash values calculated based on a plurality of second partial programs into which the program of the system being started up is divided; and
  determining, by the processor, after the start-up of the system, whether or not the calculated plurality of second partial hash values match the plurality of first partial hash values which has been already calculated and stored in the storage medium before the start-up of the system to continue execution processing of the system when the determination indicates match, and suspend the execution processing of the system when the determination does not indicate match.

3. The secure boot method according to claim 2, wherein the calculating the plurality of second partial hash values and the determining whether or not the calculated plurality of second partial hash values match the plurality of first partial hash values are carried out in a time-division manner with respect to all of the plurality of second partial programs.

4. The secure boot method according to claim 2, wherein the calculating the plurality of second partial hash values and the determining whether or not the calculated plurality of second partial hash values match the plurality of first partial hash values are carried out after start-up of the system and when the system is in a low-load state.

5. The secure boot method according to claim 4, wherein when the system is in the low-load state the system is in an idle state or when operation of the system has been terminated.

6. The secure boot method according to claim 1, further comprising:
updating, by the processor, the program of the system to a new program;
acquiring, by the processor, a plurality of first new partial hash values, and the first new legitimate hash value corresponding to the new program;
calculating, by the processor, a plurality of third partial hash values based on a plurality of third partial programs into which the updated new program is divided, and a third calculated hash value based on the calculated plurality of third partial hash values; and
determining, by the processor, both whether or not the calculated plurality of third partial hash values match the acquired plurality of first new partial hash values, and whether or not the third calculated hash value match the acquired first new legitimate hash value to continue an updating process of the system when both of the two determinations indicate match, and suspend the updating process of the system when at least one of the two determinations does not indicate match.

7. The secure boot method according to claim 1, further comprising:
updating, by the processor, the program of the system to a new program;
acquiring, by the processor, a plurality of first new partial hash values and the first new legitimate hash value, corresponding to the new program; and
instructing, by the processor, a re-start of the system.

8. The secure boot method according to claim 1, wherein the number of the plurality of first partial hash values is n, and one second calculated hash value is calculated on the basis of the n first partial hash values.

9. The secure boot method according to claim 1, wherein the number of the plurality of first partial hash values is n, one second calculated hash value is calculated on the basis of m first partial hash values among the n first partial hash values, and n/m second calculated hash values are calculated on the basis of the n first partial hash values.

10. A semiconductor device, comprising:
a storage device configured to store a program, a plurality of first partial hash values calculated based on a plurality of first partial programs into which the program is divided, and a first legitimate hash value, which is a hash value calculated based on a plurality of first partial hash values, the plurality of first partial hash values being calculated based on a plurality of legitimate partial programs into which a legitimate program is divided, the legitimate program corresponding to the program; and
a computer processor configured to execute a process including:
calculating, during start-up of the system, a second calculated hash value based on the plurality of first partial hash values which has been already calculated and stored in the storage device before the start-up of the system, and
determining, during the start-up of the system, whether or not the second calculated hash value matches the first legitimate hash value to continue the start-up processing of the system when the determination indicates match, and suspend the start-up processing of the system when the determination does not indicate match.

11. The semiconductor device according to claim 10, wherein the process includes:
calculating, after the start-up of the system, a plurality of second partial hash values, which are hash values calculated based on a plurality of second partial programs into which the program of the system being started up is divided, and
determining, after the start-up of the system, whether or not the calculated plurality of second partial hash values match the plurality of first partial hash values which has been already calculated and stored in the storage device before the start-up of the system to continue processing of executing the system when the determination indicates match, and suspend processing of executing the system when the determination does not indicate match.

12. The semiconductor device according to claim 11, wherein
the computer processor executes the calculating the plurality of second partial hash values and the determining whether or not the calculated plurality of second partial hash values match the plurality of first partial hash values in a time-division manner with respect to all of the plurality of partial programs.

13. The semiconductor device according to claim 10, wherein the process includes:
updating the program of the system to a new program,
acquiring a plurality of first new partial hash values and the first new legitimate hash value, corresponding to the new program,
calculating a plurality of third partial hash values based on a plurality of third partial programs into which the updated new program is divided, and a third calculated hash value based on the calculated plurality of third partial hash values, and
determining both whether or not the calculated plurality of third partial hash values match the acquired plurality of first new partial hash values, and whether or not the third calculated hash value match the acquired first new legitimate hash value to continue an updating process of the system when both of the two determinations indicate match, and suspend the updating process of the system when at least one of the two determinations does not indicate match.

14. The semiconductor device according to claim 10, wherein the process includes:
updating the program of the system to a new program,
acquiring a plurality of first new partial hash values and the first new legitimate hash value, corresponding to the new program, and
instructing a re-start of the system.

15. The semiconductor device according to claim 10, wherein the number of the plurality of first partial hash values is n, and one second calculated hash value is calculated on the basis of the n first partial hash values.

16. The semiconductor device according to claim 10, wherein the number of the plurality of first partial hash values is n, one second calculated hash value is calculated on the basis of m first partial hash values among the n first partial hash values, and n/m second calculated hash values are calculated on the basis of the first n partial hash values.

17. A non-transitory computer-readable recording medium having stored therein a program for causing a computer to execute a secure boot process of a system, the system including: a processor; and a storage medium configured to store a program, a plurality of first partial hash values calculated based on a plurality of first partial programs into which the program is divided, and a first legitimate hash value which is a hash value calculated based on a plurality of first legitimate partial hash values, the plurality of first legitimate partial hash values being calculated based on a plurality of legitimate partial programs into which a legitimate program is divided, the legitimate program corresponding to the program;

the secure boot method comprising:
calculating, by the processor, during start-up of the system, a second calculated hash value based on the plurality of first partial hash values which has been already calculated and stored in the storage medium before the start-up of the system; and
determining, by the processor, during the start-up of the system, whether or not the second calculated hash value matches the first legitimate hash value to continue the start-up processing of the system when the determination indicates match, and suspend the start-up processing of the system when the determination does not indicate match.

18. The non-transitory computer-readable recording medium having stored therein the program according to claim 17, wherein the secure boot process further comprising:
calculating, by the processor, after the start-up of the system, a plurality of second partial hash values, which are hash values calculated based on a plurality of second partial programs into which the program of the system being started up is divided; and
determining, by the processor, after the start-up of the system, whether or not the calculated plurality of second partial hash values match the plurality of first partial hash values which has been already calculated and stored in the storage medium before the start-up of the system to continue execution processing of the system when the determination indicates match, and suspend the execution processing of the system when the determination does not indicate match.

19. The non-transitory computer-readable recording medium having stored therein the program according to claim 18, wherein the calculating the plurality of second partial hash values and the determining whether or not the calculated plurality of second partial hash values match the plurality of first partial hash values are carried out in a time-division manner with respect to all of the plurality of second partial programs.

20. The non-transitory computer-readable recording medium having stored therein the program according to claim 17, wherein the secure boot process further comprising:
updating, by the processor, the program of the system to a new program;
acquiring, by the processor, a plurality of first new partial hash values, and the first new legitimate hash value corresponding to the new program;
calculating, by the processor, a plurality of third partial hash values based on a plurality of third partial programs into which the updated new program is divided, and a third calculated hash value based on the calculated plurality of third partial hash values; and
determining, by the processor, both whether or not the calculated plurality of third partial hash values match the acquired plurality of first partial new hash values, and whether or not the third calculated hash value match the acquired first new legitimate hash value to continue an updating process of the system when both of the two determinations indicate match, and suspend the updating process of the system when at least one of the two determinations does not indicate match.

* * * * *